United States Patent
Parakala et al.

(10) Patent No.: US 9,816,392 B2
(45) Date of Patent: Nov. 14, 2017

(54) ARCHITECTURES FOR HIGH TEMPERATURE TBCS WITH ULTRA LOW THERMAL CONDUCTIVITY AND ABRADABILITY AND METHOD OF MAKING

(71) Applicant: GENERAL ELECTRIC COMPANY, Schenectady, NY (US)

(72) Inventors: Padmaja Parakala, Karnataka (IN); Surinder Singh Pabla, Greer, SC (US); Joshua Lee Margolies, Niskayuna, NY (US); James Anthony Ruud, Delmar, NY (US); Krishnamurthy Anand, Karnataka (IN); Jon Conrad Schaeffer, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 363 days.

(21) Appl. No.: 13/860,044

(22) Filed: Apr. 10, 2013

(65) Prior Publication Data
US 2014/0308479 A1    Oct. 16, 2014

(51) Int. Cl.
*F01D 25/00* (2006.01)
*C23C 4/08* (2016.01)
(Continued)

(52) U.S. Cl.
CPC .......... *F01D 25/005* (2013.01); *C04B 35/486* (2013.01); *C04B 35/50* (2013.01);
(Continued)

(58) Field of Classification Search
CPC ... F01D 25/005; C23C 28/3215; C23C 4/085; C23C 4/105; C23C 4/127; C23C 28/042;
(Continued)

(56) References Cited

U.S. PATENT DOCUMENTS

| 4,299,865 A | 11/1981 | Clingman et al. |
| 4,764,089 A | 8/1988 | Strangman |

(Continued)

FOREIGN PATENT DOCUMENTS

| EP | 1550645 A2 | 7/2005 |
| EP | 1666627 A2 | 6/2006 |

OTHER PUBLICATIONS

European Search Report and Written Opinion issued in connection with corresponding EP Application No. 14163745.4-1362 dated Sep. 9, 2014.

(Continued)

*Primary Examiner* — Laura A Auer
(74) *Attorney, Agent, or Firm* — McNees Wallace & Nurick LLC

(57) ABSTRACT

A method for fabricating thermal barrier coatings. The thermal barrier coatings are produced with a fine grain size by reverse co-precipitation of fine powders. The powders are then sprayed by a solution plasma spray that partially melts the fine powders while producing a fine grain size with dense vertical cracking. The coatings comprise at least one of 45%-65% $Yb_2O_3$ the balance zirconia (zirconium oxide), Yb/Y/Hf/Ta the balance zirconia (zirconium oxide) and 2.3-7.8% La, 1.4-5.1% Y and the balance zirconia (zirconium oxide) and are characterized by a thermal conductivity that is about 25-50% lower than that of thermal barrier coatings comprising YSZ. The thermal barrier coatings also are characterized by at least one of excellent erosion resistance, fracture toughness and abrasion resistance.

13 Claims, 3 Drawing Sheets

(51) Int. Cl.

| | | |
|---|---|---|
| *C23C 4/10* | (2016.01) | |
| *C23C 28/00* | (2006.01) | |
| *C04B 35/486* | (2006.01) | |
| *C04B 35/50* | (2006.01) | |
| *C23C 4/02* | (2006.01) | |
| *C23C 4/11* | (2016.01) | |
| *C23C 4/134* | (2016.01) | |
| *F01D 5/28* | (2006.01) | |

(52) U.S. Cl.
CPC .............. *C23C 4/02* (2013.01); *C23C 4/11* (2016.01); *C23C 4/134* (2016.01); *C23C 28/3215* (2013.01); *C23C 28/3455* (2013.01); *C04B 2235/3224* (2013.01); *C04B 2235/3225* (2013.01); *C04B 2235/3227* (2013.01); *C04B 2235/3244* (2013.01); *C04B 2235/96* (2013.01); *C04B 2235/9607* (2013.01); *F01D 5/288* (2013.01); *Y10T 428/24471* (2015.01); *Y10T 428/24942* (2015.01); *Y10T 428/31678* (2015.04)

(58) Field of Classification Search
CPC ... C23C 28/3455; C04B 35/50; C04B 35/486; C04B 2235/3225; C04B 2235/9607; C04B 2235/3224; C04B 2235/3244; C04B 2235/3227; Y10T 428/31678
See application file for complete search history.

(56) References Cited

U.S. PATENT DOCUMENTS

| | | | |
|---|---|---|---|
| 4,914,794 A | 4/1990 | Strangman | |
| 6,235,370 B1 | 5/2001 | Merrill et al. | |
| 6,670,046 B1 | 12/2003 | Xia | |
| 6,733,907 B2 | 5/2004 | Morrison et al. | |
| 6,858,334 B1 | 2/2005 | Gorman et al. | |
| 6,916,529 B2 | 7/2005 | Pabla et al. | |
| 7,126,329 B2 | 10/2006 | Ruzzo et al. | |
| 7,198,462 B2 | 4/2007 | Merrill et al. | |
| 7,229,661 B2 | 6/2007 | Ruzzo et al. | |
| 7,504,157 B2 | 3/2009 | Huddleston et al. | |
| 7,723,249 B2 | 5/2010 | Doesburg et al. | |
| 7,846,561 B2 | 12/2010 | Kulkarni | |
| 7,955,707 B2 | 6/2011 | Xie et al. | |
| 7,955,708 B2 | 6/2011 | Doesburg et al. | |
| 2003/0180571 A1* | 9/2003 | Singh | 428/633 |
| 2003/0224200 A1* | 12/2003 | Bruce | C23C 14/083 428/632 |
| 2005/0112412 A1* | 5/2005 | Darolia | C23C 14/08 428/702 |
| 2005/0142395 A1* | 6/2005 | Spitsberg | C04B 35/486 428/701 |
| 2006/0121294 A1* | 6/2006 | Boutwell | C04B 35/486 428/469 |
| 2006/0245984 A1* | 11/2006 | Kulkarni | F23C 13/00 422/177 |
| 2008/0167173 A1 | 7/2008 | Lima et al. | |
| 2009/0258247 A1 | 10/2009 | Kulkarni et al. | |
| 2010/0048379 A1 | 2/2010 | Thippareddy et al. | |
| 2010/0069226 A1 | 3/2010 | Meschter | |
| 2010/0136349 A1* | 6/2010 | Lee | 428/446 |
| 2011/0171010 A1 | 7/2011 | Li et al. | |
| 2012/0063881 A1* | 3/2012 | Tallman | F01D 11/122 415/1 |

OTHER PUBLICATIONS

Rampon et al., "Suspension Plasma Spraying of YPSZ Coatings: Suspension Atomization and Injection", Journal of Thermal Spray Technology, Volume No. 17, Issue No. 1, pp. 105-114, Mar. 2008.
Vabben et al., "Suspension Plasma Spraying: Process Characteristics and Applications", Journal of Thermal Spray Technology, Volume No. 19, Issue No. 1-2, pp. 219-225, Jan. 2010.
Chen et al. "Coprecipitation Synthesis and Thermal Conductivity of La2Zr2O7", Journal of Alloys and Compounds, Volume No. 480, pp. 843-848, 2009.
Kent et al., "In-Flight Alloying of Nanocrystalline Yttria-Stabilized Zirconia using Suspension Spray to Produce Ultra-Low Thermal Conductivity Thermal Barriers", Journal of Applied Ceramics Technology, Volume No. 8, Issue No. 6, pp. 1383-1392, 2011.
European Search Report and Opinion issued in connection with corresponding EP Application No. 14163745.4 dated Mar. 30, 2015.
Chinese Office Action, dated Feb. 4, 2017, 18 pages.

* cited by examiner

ARCHITECTURES FOR HIGH TEMPERATURE TBCS WITH ULTRA LOW THERMAL CONDUCTIVITY AND ABRADABILITY AND METHOD OF MAKING

FIELD OF THE INVENTION

The present invention is directed to a thermal barrier coating having ultra low conductivity, and more specifically to thermal barrier coating and method for making a thermal barrier coating having ultra low conductivity and excellent abradability.

BACKGROUND OF THE INVENTION

Thermal barrier coatings (TBCs) are used to protect underlying base materials from thermal degradation from high temperature of operation in high temperature environments. Such environments include hot sections of turbomachinery. Over time, refinements have been made to thermal barrier coatings to impart additional properties to thermal barrier systems so that they are more survivable in turbine environments.

Yttria stabilized zirconia (YSZ) is one of the most widely used coating systems for thermal barrier applications. In a gas turbine engine, hot gases of combustion moving over the TBCs cause erosion of the TBC material, while ingestion of particles into the engine can cause foreign object damage (FOD) when the particles impact the TBCs. To improve the performance of a TBC such as YSZ, Dense Vertically Cracked (DVC) TBCs were developed that have improved erosion resistance and strain compliance without impacting the thermal performance of the TBC. Where abradability such as due to blade rubs has been identified as a problem, other improvements have relied on a patterned controlled porosity to impart sufficient abradability, while maintaining both erosion resistance and low thermal conductivity.

In high temperature operation, YSZ may destabilize, degrading the erosion resistance and abrasion resistance of the thermal barrier coating significantly. To overcome problems with high temperature operation, low thermal conductivity materials are required for use at elevated temperatures, while offering further reductions in thermal conductivity and improved abradability. Ideally, such thermal barrier coating materials overcome problems with brittleness that may pose a problem with regard to FOD.

What is desired is a thermal barrier coating suitable for use at elevated temperatures having strain tolerance and resistance to crack initiation and crack growth/propagation, particularly when deposited as an abradable coating. Various problems with such a structure have retarded its development.

SUMMARY OF THE INVENTION

A method for fabricating a thermal barrier coating having a good combination of abradability, resistance to crack propagation and strength is set forth. The method for fabricating this thermal barrier coating comprises first forming the particles used for the thermal barrier coating. The particles are made using a reverse co-precipitation process. After the particles are fabricated and classified, the particles are sprayed onto a substrate using a plasma spray process.

The fabrication of the particles using the reverse co-precipitation process first requires a constant strong basic reaction solution for the reaction environment. Reverse co-precipitation provides better control of the reaction while formulating multi-cation systems. The strong basic reaction environment permits reverse co-precipitation to occur. By controlling the hydrolysis-complex process, particles for the thermal barrier coating are precipitated. Such a reaction environment provides better control of morphology, size, crystalline phase and chemical composition of the precipitated thermal barrier coating particles.

After the particles are precipitated, they are separated from the solution by filtering. The filtered particles are washed at least three times with deionized water. After washing, the particles are calcined in air at an elevated temperature to remove any volatile fraction. The calcined particles are then ball milled to produce a powder.

To overcome problems with high temperature operation, the thermal barrier coatings formed by this process are ultra-low thermal conductivity materials. These thermal barrier coating materials which have been developed by this process are fully phase stable at elevated temperatures while offering reductions in thermal conductivity and improved abradability. Compositions based on Yb—Zr oxide combinations with 45-65% $Yb_2O_3$, La—Y (7-8% zirconium oxides), and pyrochlores such as La—Yb—Zr oxides offer even more promising low thermal conductivity levels.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
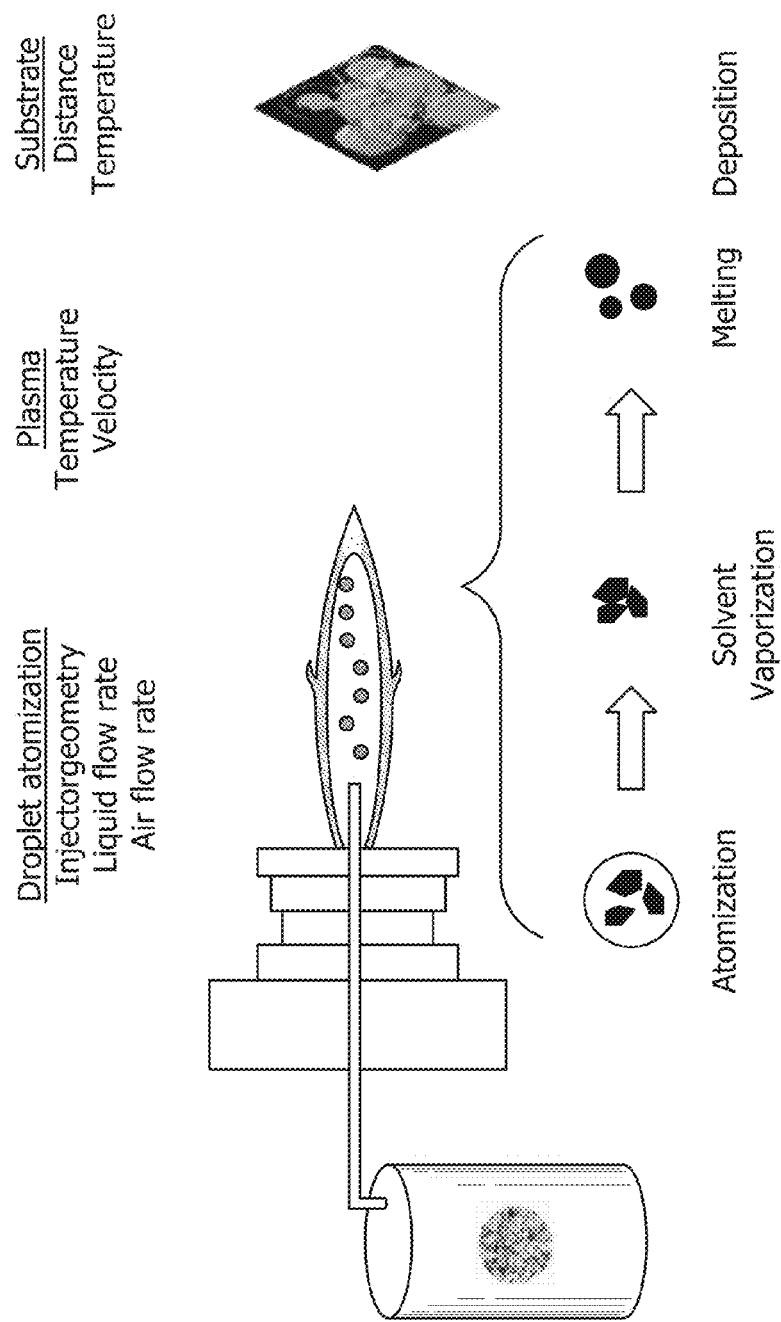
FIG. 1 depicts the preferred thermal spray application method of the present invention.

The present invention sets forth a method for fabrication of a thermal barrier coating having ultra-low thermal conductivity and a composition for the thermal barrier coating. The thermal barrier coating as applied is further characterized by abrasion resistance to overcome material loss due to blade rubs on mating casing. The thermal barrier coating is also characterized by both strain compliance and erosion resistance. Strain compliance overcomes coating loss resulting from FOD, which may initiate a crack resulting in crack propagation. Erosion is the result of the component being in the path of large volumes of hot gases of combustion and any particles that may be in the air used in the firing the fuel used to produce the hot combustion gases.

While yttria stabilized zirconia (YSZ) has been utilized in the past as a thermal barrier coating. However, at the high temperatures of operation of advanced turbine systems, TBCs comprised primarily of YSZ are destabilized resulting in deterioration in erosion and abrasion properties. Although YSZ is used as a TBC material, it is stable at temperatures up to about 2200° F. for about 24,000 hours. As the temperatures of the combustion gases may exceed 2200° F., the stability and life expectancy of YSZ decreases rapidly. This also results in deterioration of thermal protection of the substrate as the temperature-limited thermal barrier coating deteriorates and is prematurely lost due to erosion and abrasion.

The present invention utilizes thermal barrier coatings that include rare earth materials or rare earth oxide materials. As used herein, rare earth materials include lanthanum. The rare earth materials and rare earth oxide materials when applied as fine grain material provide dense vertical cracking and have superior (i.e. lower) thermal conductivity for its intended purpose of thermal barrier coating material than prior art thermal barrier materials. In this broadest embodiment, the thermal barrier coatings are applied as a layer and comprise at least one of the materials selected from the group consisting of 45%-65% $Yb_2O_3$ the balance zirconia (zirconium oxide), Yb/Y/Hf/Ta the balance zirconia (zirconium oxide) and 2.3-7.8% La, 1.4-5.1% Y and the balance zirconia (zirconium oxide). The thermal barrier coating materials are produced as a fine powder, in the range of submicron size up to about 10 um. The fine powders are mixed with a carrier fluid and applied to a substrate using a solution plasma spray process. At least one advantage of the solution plasma spray process is that the fine powders in the solution as a mixture are less inclined to clog the plasma spray nozzle.

More specifically, the present invention utilizes coatings comprised of $Yb_2O_3$ or Yb/Y/Hf/Ta/Zr. The compositions, the average tensile strength and erosion resistance of the preferred compositions are set forth in Table 1. As is indicated in Table 1, some of the coatings identified by ID 1249, 1250, 1251 and 1256 and referred to as Group 1 are characterized by an average tensile strength of about 3000-4000 psi, while having poor erosion resistance. But these coatings also have very low thermal conductivity when compared to the thermal conductivity (K) of baseline YSZ. Coatings identified by ID 1249, 1250 and 1251 each have thermal conductivities (K) that are about 30% lower than that of baseline YSZ. Coating 1256 has a thermal conductivity (K) that is about 50% lower than that of YSZ. As used herein, a very low thermal conductivity or ultralow thermal conductivity, which are used interchangeably, refer to thermal conductivities (K) that are at least 30-50% lower than that of baseline YSZ. The remaining eight coatings listed in Table 1 and identified as Group 2 have superior tensile strength, about 6500-7100 psi, but reduced erosion resistance compared to the four coatings of Group 1 listed in Table 1. Generally, these eight coatings of Group 2 have excellent tensile strength, far superior to that of the Group 1 coatings. The Group 2 coatings also have low thermal conductivity (K) and comparable to that of YSZ, although inferior to the thermal conductivity (K) of the Group 1 coatings. The Group 2 coatings have erosion resistance superior to that of the Group 1 coatings. The coating materials in Table 1 can generally be broken down into two groups: Group 1 characterized by ultralow conductivity, excellent erosion resistance and low tensile strength and Group 2 having low thermal conductivity, good erosion resistance and higher tensile strength. All of the coatings listed in Table 1 are survivable above 2200° F., to temperatures above 2400° F., with no deterioration in performance or life expectancy. Erosion resistance of the coatings was measured in accordance with ASTM G76. 240 grit alumina was used as the erodent. A 600 gram charge of alumina was fed through a 2.4 mm inner diameter nozzle at a fixed angle of 20° during a 90-120 second period. The time per mil scar depth measured on the coating (sec/mil) provided the erosion values set forth in Table 1.

100% dense YSZ exhibits an average hardness of about 1316VHN. By contrast the coating identified as 1256 in Table 1 with a density of 97%, has an average hardness was 1016VHN. The coatings in group 1 of Table 1 exhibit similar hardnesses. The fracture toughness of YSZ is about ~1.4 $MPam^{1/2}$, while the fracture toughness of the coating identified as 1256 in Table 1 has a fracture toughness of about 1.2 $MPam^{1/2}$ for 1256. The coatings in group 1 of Table 1 exhibit similar fracture toughnesses. Thus, the hardness and fracture toughnesses of the coatings in group 1 of Table 1 are comparable to YSZ. The coatings in group 2 of Table 1, coatings identified as 1252 1252-B 1253 1253-B 1254 1254-B 1255 1255-B, which have similar fracture toughnesses and hardnesses, have a higher fracture toughness and higher hardness than either the coatings in group 1 of Table 1 or YSZ, as may be expected from the higher average tensile strengths reported in Table 1.

The coatings listed in Table 1 have thermal conductivities that are 25-50% lower than the thermal conductivity (k) of the well-known and widely used TBC, YSZ. YSZ has a k=2.2 W/mK, which forms a baseline, whereas the coating identified in Table 1 as 1256 has a k-value that is about 50% lower than YSZ, the coating identified as 1251 has a k-value that is about 30% lower than YSZ. The superior erosion resistant materials are the t' materials of Group 2 which have a thermal conductivity equivalent to that of the baseline YSZ. A TBC providing lower thermal conductivity and improved erosion resistance allows key hot gas components in the gas turbine engine to operate for longer periods of time and at higher firing temperatures, thereby allowing the turbine to operate at significantly higher overall efficiencies.

The cooling benefits of a TBC engineered with a 30% lower thermal conductivity increases the overall cycle efficiency, including hot section turbine components such as buckets, nozzles etc., by at least 0.1%. This 30% drop in thermal conductivity (k) translates into an efficiency improvement of the combined cycle of about 0.1%, while a 50% drop in thermal conductivity provides an efficiency improvement of about 0.2%.

Alternatively stated, when the coatings of the present invention are applied to turbine components including but not limited to buckets and nozzles, without changing firing temperatures, the lower thermal conductivity coatings may reduce the base metal temperatures of the component base metal in the hottest zones of the engine by at least 25° F. while extending the expected life of the hot section components up to about 50%. As will be explained, the coatings of the present invention can be combined to provide a TBC coating that results in a 30-50% lower thermal conductivity at temperatures above 2200° F., and preferably at or above 2400° F., compared to the well known YSZ coatings.

The present invention utilizes coatings comprised of $Yb_2O_3$, Yb/Y/Hf/Ta/Zr, or YSZ that includes La and Y. While all of the compositions are suitable for use at elevated temperatures of operation, the Group 1 TBCs, identified as 1249, 1250, 1251 and 1256, are preferred because of their superior erosion resistance to provide the desired life expectancy. However, these coating compositions, which are characterized as t' which are softer, suffer from inferior tensile strength, making them less desirable for use in applications in which high tensile strength is required, such as, rub-ins. The Group 2 coating compositions, characterized by a cubic structure, are suitable for use at the elevated temperatures of operation and are preferred for applications such as rub-ins, where high strength and fracture toughness is required. However, these coatings suffer from inferior erosion resistance, making them less suitable for use in the hot gas flow path due to the erosion.

TABLE 1

| ID | Powder Composition | Average Tensile Strength (psi) | Erosion sec/mil |
|---|---|---|---|
| 1249 | 45% $Yb_2O_3$ | 3404 | 5 |
| 1250 | 55% $Yb_2O_3$ | 3505 | 3 |
| 1251 | 65% $Yb_2O_3$ | 3407 | 4 |
| 1256 | Yb/Y/Hf/Ta/Zr | 3876 | 6 |
| 1252 | 2.3% La 5.1% Y | 6594 | 42 |
| 1252-B | 2.3% La 5.1% Y | 7864 | 52 |
| 1253 | 3.9% La 4.1% Y | 6690 | 40 |
| 1253-B | 3.9% La 4.1% Y | 6942 | 49 |
| 1254 | 5.9% La 2.7% Y | 7419 | 45 |
| 1254-B | 5.9% La 2.7% Y | 8284 | 39 |
| 1255 | 7.8% La 1.4% Y | 7248 | 52 |
| 1255-B | 7.8% La 1.4% Y | 7072 | 40 |

All of the compositions listed in Table 1 above are provided in weight percentage, and zirconia, $ZrO_2$, comprises the balance of each of the listed compositions.

The above coatings, however, may be applied in multiple layers, each layer having the properties desired. These coatings may also be used with the well known YSZ coatings to extend the available envelope of usage of the YSZ coatings. Because the coatings are produced as powders, they also may be blended together to provide a range of properties with varying strength/abrasion resistance, erosion resistance and thermal conductivity. The use of these materials to extend the available envelope of YSZ is desirable because the low thermal conductivity materials of Table 1 utilize expensive, exotic rare earth elements such as lanthanum and ytterbium. The cost and availability of rare earth elements is well-documented at this time. By using these exotic higher cost, low thermal conductivity materials that include rare earth additions with the cheaper YSZ materials, the overall coating costs can be reduced by controlling the amount of exotic material used, while improving the life and capability of the component and the efficiency of operation of the turbine.

All of the TBCs identified above were applied to a substrate by a method that produces a dense vertically cracked (DVC) microstructure. Such a microstructure provides superior erosion resistance and strain compliance as compared to TBCs of similar composition in which the microstructure is not controlled. The TBCs identified above have low thermal conductivity at elevated temperatures.

Figure 2:
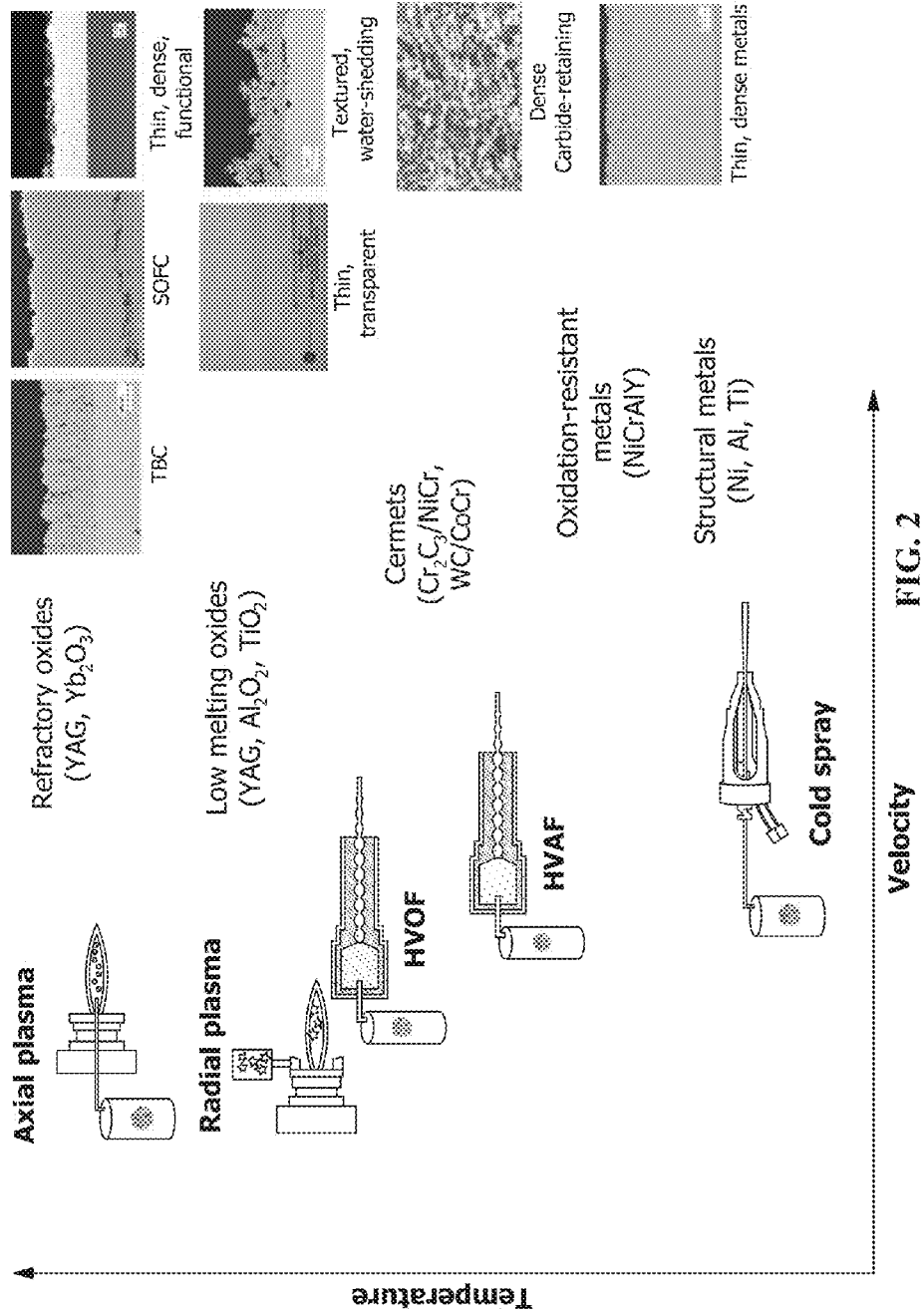
FIG. 2 contrasts various spray methods for applying coatings to substrates.
Figure 3:
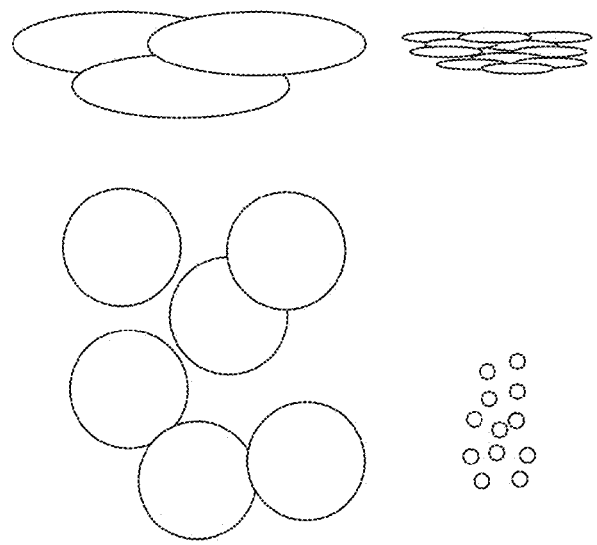
FIG. 3 depicts an embodiment of the present invention applied to a substrate depicting an outer layer in the form of abradable ridges comprising a porous TBC and an inner dense vertically cracked (DVC) of the present invention.
Figure 3:
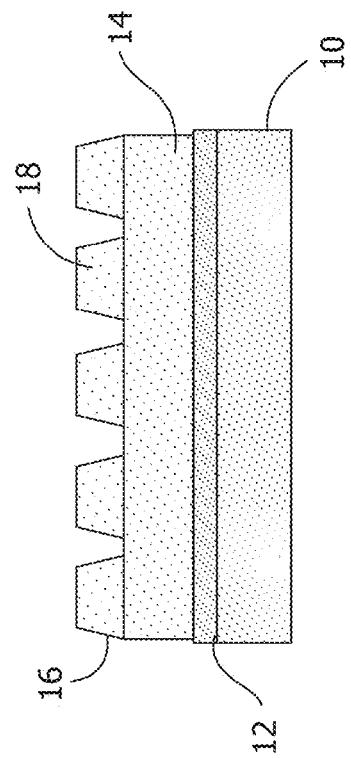

The DVC microstructure is characterized by a refined microstructure with fine grains as compared to standard YSZ coatings. While standard YSZ coatings also may exhibit a vertically cracked microstructure, the grain size is larger because of the size of the powder particles and the method used to apply the powder particles. YSZ coatings are applied by an air plasma spray process, and the particles typically have an average size in the 40-50 μm range. The particles tend to splat on contact with the substrate, leaving a relatively large grain size in which the grains have a pancake shape. While the coating will form cracks to relieve internal stresses and the cracks will be substantially vertical, the mean distance between the cracks is determined by the grain size, as depicted in FIG. 3, top right side. Coatings in accordance with the present invention are applied by a Suspension Plasma Spray Process utilizing powders that have an average size of 0.5-5 μm, which is at least a factor of 10 smaller than powders used for YSZ coatings. The Suspension Plasma Spray process of the present invention is shown generically in FIG. 1. FIG. 2 shows various applications for Suspension Thermal Spray, the high temperature axial plasma spray process being used in the present invention because of the high melting temperatures of the thermal barrier coating powders used in the TBC of the present invention. The Suspension Plasma Spray Process does cause partial melting of the particles, and while the fine particles exhibit some deformation, the degree of deformation of these smaller particles is less pronounced and the fine powder size yields a fine grained microstructure, as shown in FIG. 3, right side bottom. This coating will also crack vertically to relieve internal stresses, and once again, the mean distance between cracks is determined by grain size. However, because the average grain size is significantly smaller, the mean distance between cracks is also reduced and the density of cracks is increased. Because the grains are smaller, the path of the cracks is less tortuous resulting in a less circuitous vertical pathway. The fine grains and dense crack pattern contribute to strain tolerance and resistance to further crack initiation and crack propagation. Although the crystal structure is inherently brittle, the reduced grain size introduces a large number of interfaces per unit length, these interfaces imparting a certain degree of compliance. Thus, the coating produced by the methods of the invention are more capable of withstanding solid particle impact, rubs resulting from transients producing blade cutting into the shroud/casing and foreign object impact while sustaining less damage than prior art YSZ coatings. The fine grain size is a direct result of the fine powders obtained by reverse co-precipitation and the suspension plasma spray application of the fine powders, producing a softer material with better strain tolerance. The grain size is directly related to the size of the powders produced by the co-precipitation process. If a crack is introduced by any of these common mechanisms, the fine grains produce a tortuous path to inhibit crack propagation along the particle/particle interfaces.

The powders are made using a reverse co-precipitation process. The reverse co-precipitation process provides better control of the morphology of the multiple precipitates that are produced, while rendering optimized particle sizes. Reverse co-precipitation is initiated in a strong basic reaction solution. A reverse co-precipitation reaction results in better control of morphology, size crystalline phase and chemical composition of the final precipitate.

The method for providing the fine grained particles first involves fabricating the composition used for the TBC as a powder. All of the preferred compositions set forth in Table 1 are fabricated as powder by the same reverse co-precipitation process. The reverse co-precipitation process permits better control of the rate of the reaction while formulating these multi-cation systems with the advantage of higher cation homogeneity in the precursor solution. Yb—Zr-based oxide compositions, $Yb_2O_3$, Yb-Y-Hf-Ta-Zr, produced by the reverse co-precipitation process, comprise about 30-40% by weight Yb and about 30-40% by weight lanthana. Exemplary compositions may further include hafnia ($HfO_2$) and/or tantala ($Ta_2O_5$), a non-limiting example of which is 30.5% by weight Yb, 24.8% by weight lanthana, 1.4% by weight hafnia, 1.5% by weight tantala and the balance zirconia (zirconium oxide) and incidental impurities. Unless otherwise specified herein, all compositional ranges are identified as weight percentages. The term "balance essentially zirconia" is used to include, in addition to zirconia, small amounts of impurities and other incidental elements, some of which have been described above, that are inherent in such TBC coating compositions, which in character and/or amount do not affect the advantageous aspects of the coating compositions.

2-3% $La_2O_3$ and 4-5% $Y_2O_3$ powders were prepared by reverse co-precipitation in such a manner that the precipitation reaction occurs in a strong basic reaction environment having a pH in the range of 10-13. This basic reaction environment allows for better control of the hydrolysis-complex process, resulting in a better control of morphology, size, crystalline phase and chemical composition of the final precipitate. First, oxides of the powders with the desired molar ratio were dissolved in a nitric acid and distilled water mix at an elevated temperature, preferably 176-203° F., (80-95° C.), and most preferably 194° F. (90° C.). The solution was stirred for a predetermined period of time to assure the complete dissolution of the powder. The concentration of the solution was adjusted to 0.1M. Ammonium hydroxide having a concentration of 1M was then prepared. The solution of powder and nitric acid was added to the ammonium hydroxide solution in a drop-wise fashion at a rate of 1-3 ml/min., allowing the ammonium hydroxide to react with the powder solution. As there is excess amounts of OH— at the start of the reaction, depending upon the powder composition or mixtures thereof selected from Table 1, cations of $Zr_4^+$, $Y_3^+$, $Yb_3^+$ and/or $La_3^+$ can co-precipitate, providing a stoichiometric and homogeneous composition. This co-precipitation permits the formation of complex powders at low temperatures from precursor materials having mixed uniformity at the molecular level. While the reverse co-precipitation reaction is set forth as a batch process, it will be understood that the reaction can be maintained as a continuous process by proper replenishment of the ammonium hydroxide while maintaining pH in the required range as the powder solution is added.

When the reaction is complete (when there is no more precipitate formed), the precipitate is filtered from the solution and then washed three times with deionized water. The washed precipitate is then dried at an elevated temperature, preferably 194° F. (90° C.) for about 12 hours, yielding nano-sized particles having a size range of about 20-30 nanometers (nm).

These particles were then calcined at an elevated temperature in the range of 1300-1850° F. (700-1000° C.), preferably about 1475° F. (800° C.), in air for 1-4 hours. After calcining, the powder size increased to a size in the range of 1-5 microns (μm). At lower temperatures and shorter times, the hydroxides form precipitates of corresponding oxides, which are amorphous in nature. However, with increasing temperature and time, the crystallinity of the precipitates increases.

After calcining, the calcined precipitate particles are ball milled into a powder. Wet ball milling was carried out in polyurethane containers using YSZ balls as the milling media. Preferably, a ratio of 1:15 or powder:media was used in a liquid carrier, preferably ethanol. The ratio powder to ethanol preferably was 1.0:5 (by weight). Milling was carried out for about 5 hours. The product was then dried for a predetermined period of time at a predetermined temperature to evaporate the carrier. For ethanol, a preferred temperature is about 195° F. (90° C.) for about 5 hours. The dried powders were then hand ground for a sufficient length of time to remove any soft agglomerates, preferably about 3 minutes.

After ball milling, the dried powders were compressed to form pellets using a 15 mm die with compaction pressures of 10,000 psi. Dies of different sizes requiring different pressures may be used to form pellets of different sizes from a sample of the powders, if desired. The pellets were then isostatically pressed under pressures of 25 bars and sintered in air to form pellets of bout the same size as the die. After sintering, the pellets are then analyzed for phase structure by a microscopic evaluation. Once it is determined that the sintered pellets have the proper phase structure, the thermal conductivity of the pellets are measured. After confirmation of thermal conductivity of a material lot, if performed, the powders may be classified by size.

In order to obtain a final thermal barrier coating that has a substantially uniform grain size, it is necessary to screen the particles so that particles are within a desired size distribution. If the particles are not within a predetermined size distribution, then there may be particles of undesirable size present that may adversely affect the grain size and hence the strain compliance of the final structure resulting in undesirable crack initiation or crack propagation.

Once the sintered particles have been characterized so that all of the aforementioned properties and size requirements have been satisfied, the particles are ready for application as a thermal barrier coating. While any method may be utilized that produces a dense vertically cracked (DVC) TBC, a preferred method for achieving such a structure is a Suspension Plasma Spray operation utilizing a plasma gun. Powders of a predetermined size are suspended in a carrier liquid. Any liquid carrier, such as organic solvents including for example, alcohol, trichloroethane (TCA) trichlorethylene (TCE), acetone, or even water may be used. The particles are micron sized particles. The suspension of powders of a predetermined size distribution range provides a known size of particles to the plasma spray unit. Preferably, particles having a size distribution of about 0.5-5 μm are suspended in ethanol. When using this combination, the preferred power of the plasma torch is about 100 watts, nitrogen is the atomizing gas, the suspension feed rate is about 25 grams/minute, the speed of the torch across the substrate is about 600 mm/sec and the spray distances between the torch nozzle and the substrate is between about 50-100 meters. It will be understood that different sized particles, different atomizing gases and different carrier liquids may utilize different settings. The particles and the carrier liquid are atomized and the carrier liquid is vaporized while the particles are at least partially melted. The particles are directed to the substrate.

In a preferred embodiment, the substrate may be provided with an MCrAlY bond coat, where M is an element selected from nickel (Ni), cobalt (Co), chromium (Cr) and combinations thereof. As can be seen from FIG. 2, which generically depicts various coating application devices (and the associated methods), plasma spray devices and their methods deliver coating particles to the article substrate at higher temperatures, although at lower velocities. Referring back to FIG. 1, the suspended pellets, which were characterized to provide a predetermined size distribution, are at least partially melted by the plasma prior to delivery to the substrate surface. The plasma spray processes are uniquely suited to provide sufficient energy to at least partially melt the high melting point ceramics of the present invention to provide a structure that is thin and dense, but which still retains a fine grain structure as the melted particles substantially freeze on impact without experiencing grain growth.

FIG. 3 depicts an embodiment of the present invention applied to a substrate 10 depicting an outer layer 16 in the form of abradable ridges 18 comprising a porous TBC and an inner dense vertically cracked (DVC) TBC of the present invention comprising an inner layer 14. The inner layer 14 is applied over a bond coat 12, such as the previously discussed MCrAlY. This embodiment permits an abradable and sacrificial outer layer 16 having ridges 18 to be applied over the substrate 10. Even if this sacrificial outer layer 16 is lost due to blade rubbing as a result of early transients, the inner layer 14 is retained to provide the ultralow thermal conductivity required to protect the substrate 10.

The coatings of the present invention can be utilized to enhance the performance of the components of the turbine engine, and hence the turbine engine in any one of several different ways. First, any one of the coatings of the present invention can be substituted for standard YSZ coatings, improving the performance of the turbine engine components. The coatings may also be used in combination with one another to improve performance. Thus, for example, one of the stronger coatings, the group 2 coatings, may be applied over the more erosion resistant coatings, the group 1 coatings. The group 2 coatings can be relied upon for abrasion resistance during early stages of turbine operation as wear-in occurs. However, over time, as the group 2 coatings erode from contact with the hot gas stream, the group 1 coatings will ultimately be exposed with their superior erosion resistance, all the while providing superior low conductivity. In order to reduce costs while extending the life expectancy of YSZ, either one or both of the group 1 and group 2 coatings may be applied over YSZ. In this circumstance, by applying the coatings to the proper thickness, the YSZ may be maintained below 2200° F. thereby extending its life. In still another embodiment, powders of group 1 and group 2 may be mixed together to formulate one or more coatings have preselected thermal conductivity, erosion, hardness, fracture toughness and tensile properties. These "blended" compositions may be applied over the component substrate or over a YSZ coating. In yet another embodiment, YSZ powder may be blended with one or more of the "blended" compositions to provide preselected thermal conductivity, erosion, hardness, fracture toughness and tensile properties.

In one example, a thermal barrier coating was formed by spraying a flashcoat of 7-YSZ over a NiCrAlY bondcoat. Then, a coating from Group 1 was applied over the 7-YSZ layer, and a coating from Group 2 was applied over the Group 1 layer. Both Group 1 and Group 2 layers were applied by solution plasma spray. In first example, the Group 1 and Group 2 layers were applied to a total thickness of 10 mils (0.010"). In a second embodiment, the Group 1 and Group 2 coatings were applied to a total thickness of 35 mils (0.035"). The plasma power was maintained at 53 kW for application of the powders of Group 1 and Group 2, which was sufficient to partially melt the powders. Although the substrate temperature was not monitored, because of the low wattage, the temperature was quite low as compared to powder applications applied by the DVC process.

The present invention provides coatings having low thermal conductivity and ultra-low conductivity to be used in higher temperature applications in which prior art YSZ coatings destabilized as their erosion resistance and abrasion resistance degraded. The $Yb_2O_3$ coatings and the Yb/Y/Hf/Ta/Zr coatings, when applied in accordance with the methods of the present invention, retain excellent erosion resistance and abrasion resistance. These DVC TBCs have superior low conductivity so as to improve the performance of the base material by at least 25° F., and can lead to an improvement of 50% in the life of the base material. Alternatively, the TBC of the present invention may allow the base material to be utilized in an application having higher operating temperatures without affecting the life of the base material, while providing higher operating efficiency to the turbomachinery. The fine grain size provides toughness and strain compliance, reducing crack initiation and propagation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermal barrier coating system, comprising:
a turbine component comprising: a turbine component substrate; and
at least one thermal barrier coating layer applied over the turbine component substrate, wherein the at least one thermal barrier coating layer includes a material comprising at least one rare earth element or rare earth oxide comprising one or more of yttrium, lanthanum and ytterbium, the at least one thermal barrier coating selected from one or a combination of the following, present by weight percent:
a layer having 3.9% La and 4.1% Y, the balance of the layer zirconia;
a layer having 5.9% La and 2.7% Y, the balance of the layer zirconia;
a layer having 7.8% La and 1.4% Y, the balance of the layer zirconia; and
a layer having 30.5 wt % ytterbia, 24.8 wt % lanthana, 1.4 wt % hafnia, 1.5 wt % tantala, the balance of the layer zirconia and incidental impurities,
the thermal barrier coating layer having dense vertical cracking with a grain size in the range of 0.5 to 5 m having a predetermined grain size distribution and a thermal conductivity lower than 2.2 W/mK by about 25-50% with a fracture toughness not less than about 1.2 $MPam^{1/2}$.

2. The thermal barrier coating system of claim 1, further comprising a bond coat layer applied to the turbine component substrate over which the at least one thermal barrier coating layer is applied.

3. The thermal barrier coating system of claim 2, further comprising an outer layer having at least one of a higher abrasion resistance and a higher erosion resistance than the thermal barrier coating layer overlying the bond coat layer.

4. The thermal barrier coating system of claim 2 further comprising an inner layer adjacent the bond coat layer, the inner layer comprising yttria-stabilized zirconia.

5. The thermal barrier coating system of claim 1, wherein the thermal barrier coating comprises a plurality of thermal barrier coating layers applied over one or more of an inner layer comprising yttria-stabilized zirconia and a bond coat layer, and wherein at least one of the plurality of layers has a thermal conductivity lower than the inner layer by 25-50%, and wherein at least one of the plurality of layers has at least one of a higher erosion resistance and a higher abrasion resistance than the inner layer.

6. The thermal barrier coating system of claim 5, comprising an outer layer comprising La and Y the balance zirconia, selected from one of 3.9 wt % La and 4.1 wt % Y, 5.9 wt % La and 2.7 wt % Y, and 7.8 wt % La and 1.4 wt % Y.

7. The thermal barrier coating system of claim 6, one or more of the plurality of thermal barrier coating layers and the outer layer comprising La-Yb-Zr oxides comprising from 30-40 wt % lanthana and 30-40 wt % ytterbia.

8. The thermal barrier coating system of claim 1, the thermal barrier coating layer, further comprising one or more of an inner layer comprising yttria-stabilized zirconia and a bond coat layer.

9. The thermal barrier coating system of claim 1, further comprising a plurality of abradable ridges on the thermal barrier coating layer.

10. The thermal barrier coating system of claim 1, wherein the thermal barrier coating layer is chemically homogeneous.

11. A thermal barrier coating system, comprising:
a turbine component comprising:
  a turbine component substrate; and
  a thermal barrier coating layer applied over the turbine component substrate, wherein the thermal barrier coating layer consists of at least one rare earth element or rare earth oxide comprising one or more of lanthanum and ytterbium, the thermal barrier coating layer selected from one or a combination of the following, present by weight percent:
a layer having 3.9% La and 4.1% Y, the balance of the layer zirconia;
a layer having 5.9% La and 2.7% Y, the balance of the layer zirconia;
a layer having 7.8% La and 1.4% Y, the balance of the layer zirconia; and
a layer having 30.5 wt % ytterbia, 24.8 wt % lanthana, 1.4 wt % hafnia, 1.5 wt % tantala, the balance of the layer zirconia and incidental impurities,
the thermal barrier coating layer having a thermal conductivity lower than 2.2 W/mK by about 25-50% with a fracture toughness not less than about 1.2 MPam$^{1/2}$.

12. A thermal barrier coating system, comprising:
a turbine component comprising:
  a turbine component substrate; and
  at least one thermal barrier coating layer applied over the turbine component substrate, wherein the thermal barrier coating layer consists of a material comprising at least one rare earth element or rare earth oxide comprising one or more of yttrium, lanthanum and ytterbium, the at least thermal barrier coating layer selected from one or a combination of the following, present by weight percent:
a layer having of 3.9% La and 4.1% Y, the balance of the layer zirconia;
a layer having 5.9% La and 2.7% Y, the balance of the layer zirconia;
a layer having 7.8% La and 1.4% Y, the balance of the layer zirconia; and
a layer having 30.5 wt % ytterbia, 24.8 wt % lanthana, 1.4 wt % hafnia, 1.5 wt % tantala, the balance of the layer zirconia and incidental impurities,
the thermal barrier coating layer having dense vertical cracking with a grain size in the range of 0.5 to 5 m having a predetermined grain size distribution and a thermal conductivity lower than 2.2 W/mK by about 25-50% with a fracture toughness not less than about 1.2 MPam$^{1/2}$.

13. The thermal barrier coating system of claim 12 wherein the zirconia includes yttria-stabilized zirconia (YSZ).

* * * * *

UNITED STATES PATENT AND TRADEMARK OFFICE
CERTIFICATE OF CORRECTION

PATENT NO. : 9,816,392 B2
APPLICATION NO. : 13/860044
DATED : November 14, 2017
INVENTOR(S) : Parakala et al.

It is certified that error appears in the above-identified patent and that said Letters Patent is hereby corrected as shown below:

In the Claims

Column 10, Line 41, Claim 1 reads: "cracking with a grain size in the range of 0.5 to 5 m" but it should read "cracking with a grain size in the range of 0.5 to 5 µm".

Column 12, Line 26, Claim 12 reads: "cracking with a grain size in the range of 0.5 to 5 m" but it should read "cracking with a grain size in the range of 0.5 to 5 µm".

Signed and Sealed this
Seventh Day of June, 2022

Katherine Kelly Vidal
*Director of the United States Patent and Trademark Office*